US012594503B2

(12) United States Patent
Boudaoud

(10) Patent No.: US 12,594,503 B2
(45) Date of Patent: Apr. 7, 2026

(54) SUBMOVEMENT-BASED MOUSE INPUT CHEATING DETECTION

(71) Applicant: Nvidia Corporation, Santa Clara, CA (US)

(72) Inventor: Ben Boudaoud, Durham, NC (US)

(73) Assignee: NVIDIA Corporation, Santa Clara, CA (US)

( * ) Notice: Subject to any disclaimer, the term of this patent is extended or adjusted under 35 U.S.C. 154(b) by 581 days.

(21) Appl. No.: 17/732,698

(22) Filed: Apr. 29, 2022

(65) Prior Publication Data

US 2023/0241511 A1     Aug. 3, 2023

Related U.S. Application Data

(60) Provisional application No. 63/305,962, filed on Feb. 2, 2022.

(51) Int. Cl.
A63F 13/75        (2014.01)
A63F 13/40        (2014.01)

(52) U.S. Cl.
CPC .............. A63F 13/75 (2014.09); A63F 13/40 (2014.09)

(58) Field of Classification Search
CPC ........ A63F 13/40; A63F 13/428; A63F 13/75; A63F 2300/204; A63F 2300/535; A63F 2300/5586
See application file for complete search history.

(56) References Cited

U.S. PATENT DOCUMENTS

| | | | | |
|---|---|---|---|---|
| 5,508,717 A | * | 4/1996 | Miller | ................ G06F 3/04842 |
| | | | | 345/157 |
| 9,517,402 B1 | | 12/2016 | Vogel | |
| 10,685,355 B2 | * | 6/2020 | Novick | ................ G06Q 20/10 |

(Continued)

FOREIGN PATENT DOCUMENTS

| | | | | |
|---|---|---|---|---|
| CN | 1700158 A | * | 11/2005 | |
| CN | 103605697 B | * | 8/2016 | ......... G06Q 30/0248 |

(Continued)

OTHER PUBLICATIONS

Hsieh, et al.; "Submovement control processes in discrete aiming as a function of space-time constraints"; Research Article; PLOS|ONE; Dec. 27, 217; 14 pgs. https://doi.org/10.1371/journal.pone.0189328.

(Continued)

*Primary Examiner* — Steven J Hylinski

(57)     ABSTRACT
A cheat detection methodology is disclosed that relates to identifying cheaters making super-human movements in interactive programs. For example, users trying to outcompete their opponents in video games using large aim assists and aim bots that perform actions that are not feasibly human. The disclosed methodology substantially reduces or even eliminates the benefit that various cheating solutions offer. In one aspect, the disclosure provides a method of monitoring cheating in interactive programs. In one example, the method includes: (1) obtaining motion data corresponding to a user input device responding to an interactive program, (2) segmenting data submovements from the motion data, and (3) determining data submovements that are a deviation of human submovements.

25 Claims, 6 Drawing Sheets

EXAMPLE OF TWO SUBMOVEMENTS USING MOTION DATA FROM A MOUSE

EXAMPLE OF FOUR TYPES OF SUBMOVEMENTS

(56) References Cited

U.S. PATENT DOCUMENTS

| | | | | |
|---|---|---|---|---|
| 2008/0098448 A1* | 4/2008 | Mondesir | ......... | H04N 21/42202 |
| | | | | 348/E5.002 |
| 2008/0319774 A1* | 12/2008 | O'Sullivan | ............ | G06Q 30/02 |
| | | | | 705/300 |
| 2009/0024460 A1* | 1/2009 | Willner | .............. | G06Q 30/0277 |
| | | | | 705/14.47 |
| 2009/0024461 A1* | 1/2009 | Willner | .............. | G06Q 30/0248 |
| | | | | 705/14.47 |
| 2010/0070620 A1* | 3/2010 | Awadallah | .......... | H04L 63/1425 |
| | | | | 709/224 |
| 2011/0251823 A1* | 10/2011 | Davis | .................... | G06Q 30/02 |
| | | | | 702/181 |
| 2014/0344927 A1* | 11/2014 | Turgeman | ............... | G06F 21/31 |
| | | | | 726/22 |
| 2015/0205955 A1* | 7/2015 | Turgeman | ............... | H04L 63/10 |
| | | | | 726/7 |
| 2016/0306974 A1* | 10/2016 | Turgeman | ............... | H04L 63/08 |
| 2017/0287287 A1 | 10/2017 | Froy et al. | | |
| 2020/0155944 A1* | 5/2020 | Witchey | .................. | A63F 13/86 |
| 2022/0072430 A1 | 3/2022 | Pimenta Ribeiro et al. | | |
| 2022/0203230 A1* | 6/2022 | Kim | ....................... | A63F 13/837 |
| 2023/0206233 A1* | 6/2023 | Aument | ............. | G06Q 20/4016 |
| | | | | 705/44 |
| 2023/0241513 A1* | 8/2023 | Spjut | ...................... | A63F 13/42 |
| | | | | 463/29 |

FOREIGN PATENT DOCUMENTS

| | | | | |
|---|---|---|---|---|
| CN | 113900879 | A | * | 1/2022 |
| TW | I751649 | B | * | 8/2020 |
| TW | 202201184 | A | * | 1/2022 |
| WO | WO-2016156513 | A1 | * | 10/2016 |

OTHER PUBLICATIONS

Mok, et al.; "A User Behavior based Cheat Detection Mechanism for Crowdtesting"; SIGCOMM'14; Aug. 17-22, 2014; 2 pgs. http://dx.doi.org/10.1145/2619239.2631447.

* cited by examiner

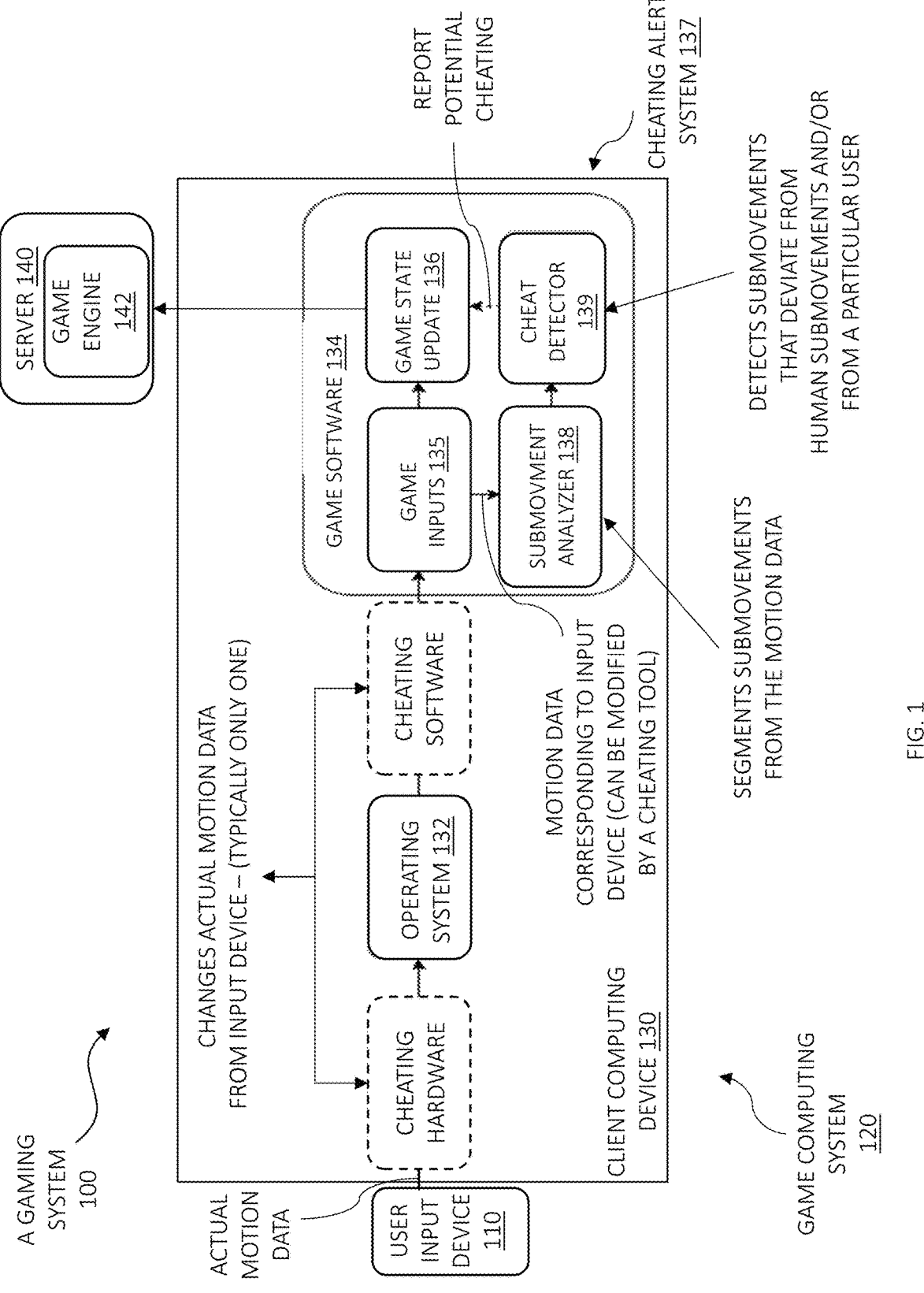

REPORT POTENTIAL CHEATING

SERVER 140

GAME ENGINE 142

CHEATING ALERT SYSTEM 137

GAME SOFTWARE 134

GAME STATE UPDATE 136

CHEAT DETECTOR 139

GAME INPUTS 135

SUBMOVMENT ANALYZER 138

DETECTS SUBMOVEMENTS THAT DEVIATE FROM HUMAN SUBMOVEMENTS AND/OR FROM A PARTICULAR USER

SEGMENTS SUBMOVEMENTS FROM THE MOTION DATA

CHEATING SOFTWARE

CHANGES ACTUAL MOTION DATA FROM INPUT DEVICE — (TYPICALLY ONLY ONE)

OPERATING SYSTEM 132

MOTION DATA CORRESPONDING TO INPUT DEVICE (CAN BE MODIFIED BY A CHEATING TOOL)

CHEATING HARDWARE

CLIENT COMPUTING DEVICE 130

A GAMING SYSTEM 100

ACTUAL MOTION DATA

USER INPUT DEVICE 110

GAME COMPUTING SYSTEM 120

FIG. 1

EXAMPLE OF TWO SUBMOVEMENTS USING MOTION DATA FROM A MOUSE

EXAMPLE OF FOUR TYPES OF SUBMOVEMENTS

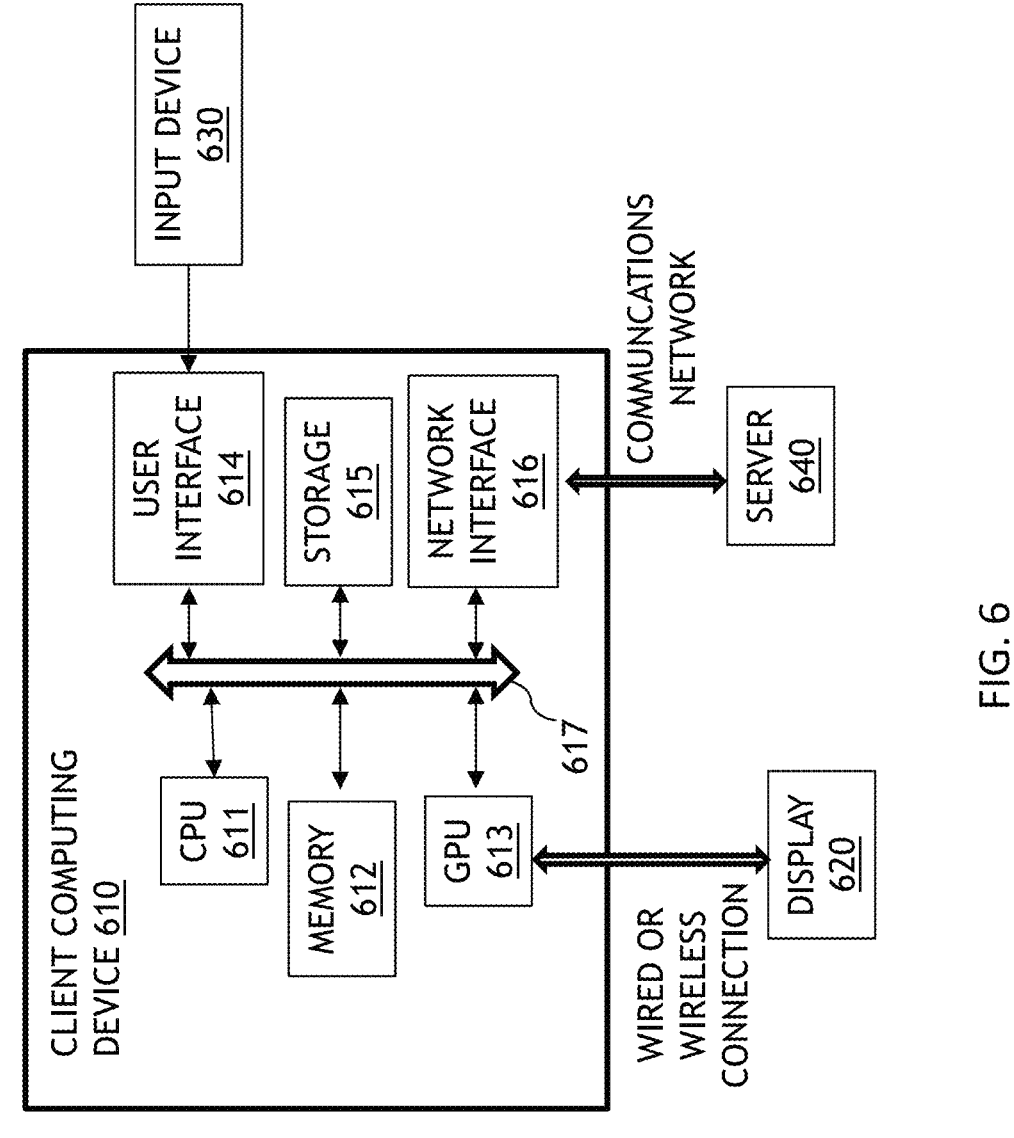
FIG. 6

SUBMOVEMENT-BASED MOUSE INPUT CHEATING DETECTION

CROSS-REFERENCE TO RELATED APPLICATION

This application claims the benefit of U.S. Provisional Application Ser. No. 63/305,962, filed by Ben Boudaoud, on Feb. 2, 2022, entitled "SUBMOVEMENT-BASED MOUSE INPUT CHEATING DETECTION," commonly assigned with this application and incorporated herein by reference in its entirety.

TECHNICAL FIELD

This application is directed, in general, to detecting cheating in video game play and, more specifically, to detecting cheating in video game play based on input devices.

BACKGROUND

With the advent of esports, competitive game play has offered users significant financial opportunities. As such, some users have tried to take advantage of existing game play systems by using a cheating tool(s) in order to improve their ranking, increase winnings, or otherwise gain an advantage over other users. Thus, game developers and game hardware manufacturers, at a minimum, have an interest in keeping their products immune from cheating tools to ensure the competitive integrity of otherwise fair game play. Otherwise, users who are playing a game where they believe cheating is occurring may stop playing the game and even limit purchasing games from the same game developer in the future.

SUMMARY

In one aspect, the disclosure provides a method of monitoring cheating in interactive programs. In one example, the method includes: (1) obtaining motion data corresponding to a user input device responding to an interactive program, (2) segmenting data submovements from the motion data, and (3) determining data submovements that are a deviation of human submovements.

In another aspect, the disclosure provides a cheat alert system for one or more interactive programs. In one example, the cheat alert system includes one or more processors that perform operations at least including: (1) segmenting data submovements corresponding to an input device, and (2) detecting data submovements that deviate from human submovements.

In yet another aspect, the disclosure provides a gaming system. In one example, the gaming system includes one or more processors to perform operations at least including: (1) receiving motion data from an input device, (2) segmenting data submovements from the motion data, and (3) detecting data submovements that deviate from human submovements.

BRIEF DESCRIPTION

Reference is now made to the following descriptions taken in conjunction with the accompanying drawings, in which:

FIG. 1 illustrates a block diagram of an example of a gaming system constructed according to the principles of the disclosure;

FIG. 6 illustrates a block diagram of an example of a computing system 600 in which at least a portion of the methods, systems, or computer program products disclosed herein for monitoring cheating in video games can be implemented.

DETAILED DESCRIPTION

Figure 2:
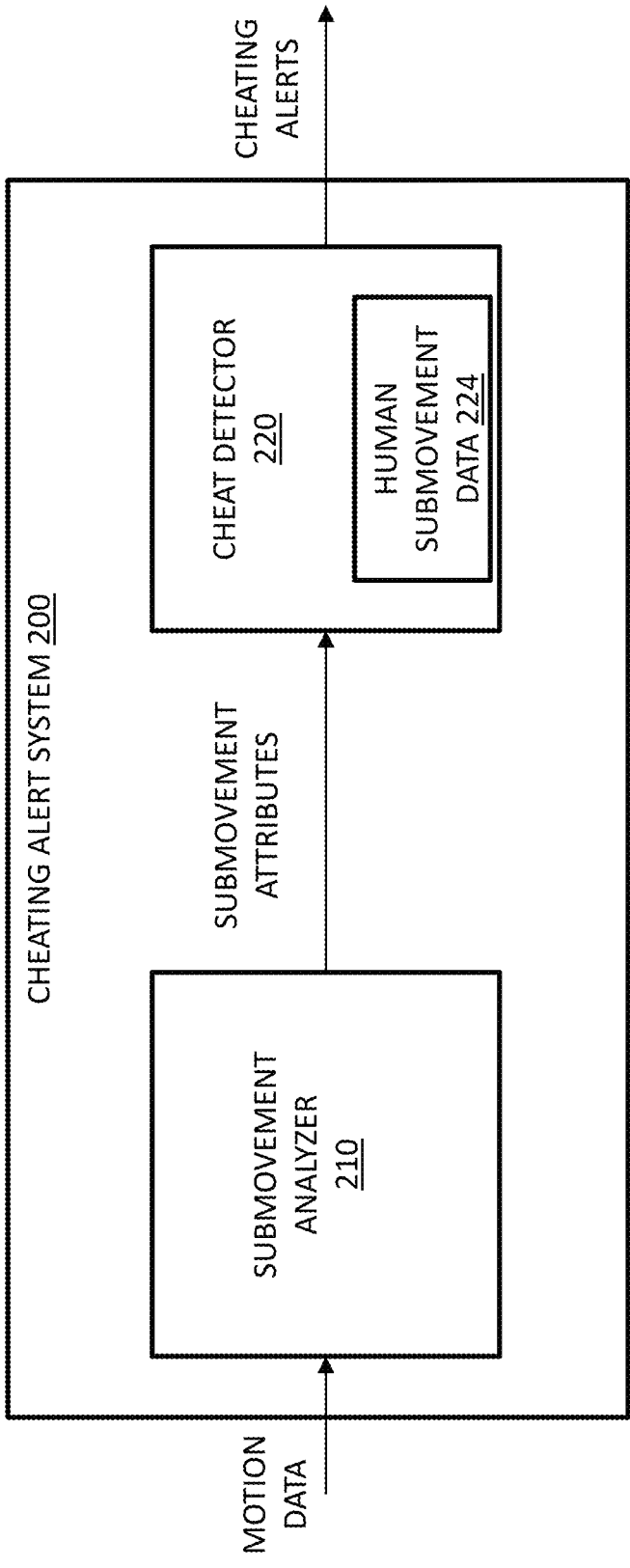
FIG. 2 illustrates a block diagram of an example of a cheating alert system constructed according to the principles of the disclosure.

There is a wide array of ways for users to cheat when playing a video game. Many of the cheating methods or strategies, however, can be thwarted by executing the video games in a trusted execution environment (TEE). A TEE is a designated portion of a processor or processors, or a piece of software that runs on a processor(s), that guarantees the data and code execution therein are secure. Nevertheless, some cheating may still go undetected even when video games are executed in such a trusted environment.

For example, some game cheating software injects synthetic mouse motion, either at a hardware or software level, to improve user performance in competitive games. In this cheating scheme, a cheating tool can look at a video game via a display or a software version of the display, react to the video game by moving and/or modifying motion of the mouse, and provide a corresponding motion input to the game system, such as via a USB port. As such, the cheating tool is potentially taking nothing out of the game system beyond the visual information a typical user would receive and is providing nothing to the game system except for the type of mouse packet data delivered via USB that the game system would usually receive from a mouse. This type of cheating scheme cannot be detected via traditional TEEs and is often designed to function together with a user as opposed to completely directing mouse motion on its own. In this type of cheating scheme, the users are not simply obtaining information through, for example, pixel data or memory access, but are providing or modifying inputs based on the information that is obtained. Accordingly, users still feel like they are skilled at playing the video game and the fun of playing can be preserved. A user includes a human game player or gamer.

The disclosure provides a cheating detection strategy for video games that delineates programmatically-generated motion from human-generated motion. For example, cheating software could automatically snap a user's aim to a correct target when within a set region around a target and perform the action associated with hitting the target. A user still feels like they are playing the game, but when the user activates their input device, such as shooting a gun or clicking a mouse button, cheating hardware and/or software (collectively referred to as a cheating tool) intervenes and makes changes to complete or improve the action for the user. The cheating detection strategy disclosed herein recognizes that these changes, such as synthetic motion, do not obey the kind of rules true of human motion. As such, the cheating detection strategy can use the inherent time-series and statistical characteristics of human submovements to delineate between synthetic motion used for aim assistance and actual user motion used for aiming.

Various concepts for detecting aim assistance cheating are disclosed including: (1) flagging optimal or near optimal computer-generated motion through its lack of conformity to the pseudo-ballistic motion trajectories generated by human beings; (2) flagging superhuman corrections to human-generated motion that occur discrete from a user's motion, but at amplitudes too large or times too close to human motion to be feasible; (3) flagging motions that may be potentially human, but do not conform to reasonable distributional assumptions about the nature of submovements (speed, error, submovement count, etc.) using statistical models for humans (e.g., general statistical models); and (4) flagging motion, using per user statistical models, that differs from historical (per player) motion in that it represents a dramatic improvement of performance that cannot be accounted for by, for example, a change in strategy or posture alone.

The motions are represented by motion data, which is positional information over time that corresponds to a user input device. The user input device is an aiming device that includes without limitation a mouse, a touchpad, or a spatially tracked controller, such as a gun, a Wii remote associated with a Nintendo gaming system available from Nintendo of America Inc. in Redmond, Washington, virtual reality (VR) controllers, and other motion sensing input devices. The user input devices provide the motion data to a computing device, such as a client computing device, via a communication port, such as a USB port. The positional information can be a time series of x and y or x, y, and z coordinates of input device motion, which can ignore position resets of the input device. The positional information can also be degrees of aim displacement, such as for first/third person video games. Using degrees can allow, for example, compensating for mouse sensitivity when a mouse is the input device.

Start and stop thresholds or a wavelet decomposition can be used to segment submovements from the motion data. The submovements segmented from the motion data are referred to herein as data submovements. Submovement attributes of the data submovements can then be used to identify the data submovements, if any, that deviate from human submovements. An example of submovement attributes that can be used include: submovement count, submovement duration, initialization, pause, and verification durations, submovement velocity, derivatives of the submovement velocity, submovement error (distance from target), and submovement shape (i.e. over/undershoot and curvature). Derivatives of the velocity include acceleration and jerk present in maximum rate acceleration or deceleration curves of the data submovements.

For distributional analysis, various submovement conditions can be used, including: game specifics, such as map, character, role, and weapon; task type, such as navigation, targeting, pre-aim, etc.; task difficulty (e.g. Fitts' Index of Difficulty), proximity to shot event(s), and proximity to/visibility of enemies. The submovement conditions can be obtained from game state information of the video game.

Detecting cheating as disclosed herein can be run either offline (on captured data) or online in real time, reporting results as they are observed. As such, for some applications more than temporary data storage is not needed. For comparing motion data to specific users, storage of user-specific historical data is needed to establish "norms" of a specific player's motion.

In addition to storage of the user-specific historical data, general human submovement data can be stored. The submovement parameters derived from the data submovements can be compared to human submovement data to determine deviations. The human submovement data can be stored and accessible by a cheat detection system. The human submovement data can be stored as part of a cheating detector or stored at other accessible storage locations, such as a server.

The disclosed cheating detection methodology is directed to the detection and alert of cheaters making super-human movements to outcompete their opponents. Specifically, those using large aim assists and aim bots that perform actions that are not feasibly human. As such, the possibility of cheating is not eliminated, but ideally, this approach substantially reduces the benefit that various cheating solutions offer to the cheater.

As discussed above, the cheating detection strategy can be used with video games where a user's action is improved. Instead of improving a user's action, a cheating tool could also intervene and impair a user's action. For example, a cheating tool may be installed or hacked by another party instead of the user and used to modify the actual motion data such that a target is missed. Cheating can also occur in other interactive applications, or programs, besides video games. Examples of such interactive programs include computer aided drafting (CAD) programs, authoring tools, animation programs, digital audio program (e.g., Garage Band), electronic document signing tools, and imaging software (e.g., x-rays, CT scans). For example, another party could alter a signature on a document signing tool. Video games will be used herein as examples but one skilled in the art will understand that the cheating detection strategy disclosed herein is also applicable to other interactive programs.

FIG. 1 illustrates a block diagram of an example of a gaming system 100 constructed according to the principles of the disclosure. The gaming system 100 includes a user input device 110 and a game computing system 120.

The user input device 110 represents motion from a user in response to viewing scenes of a video game and provides the user movement as motion data. The motion data is sent to the computing system 120 via a connection that is wireless, wired, or a combination thereof. A USB compliant cable is an example of a wired connector that can be used.

The game computing system 120 executes a video game and provides a visual display of scenes from the video game in response to motion data corresponding to the user input device 110. The game computing system 120 is implemented on one or more computers or computing devices having one or more processing units, i.e., processors. For example, the game computing system 120 can be implemented on a client computing device 130 and a server 140 as shown in FIG. 1. An operating system 132 of the client computing device 130 receives the motion data via a device interface, such as a USB port. The client computing device 130 includes a screen (not shown) that is used to display the scenes of the video game.

The motion data is provided to game software 134 implemented on the client computing device 130. When a cheating tool is present on the client computing device 130 or between the user input device 110 and the client computing device 130, the motion data that is received by the game software 134 can be altered or modified, such as using synthetic motion to provide aim assistance. The altered motion data can be referred to as modified motion data. The game software 134 includes different functionalities that are denoted as game input 135, game state update 136, and cheating alert system 137. The game software 134 can include other functionalities, such as a game engine that executes the video game itself. In FIG. 1, the game engine 142 is located on the server and receives game state updates from the client computing device 130 and the other illustrated functionalities of the game software 134 are located on the client computing device 130. The functionalities of the game software 134 can be distributed between the client computing device 130 and the server 140 and can vary for different game computing systems. For example, the cheating alert system 137 or a portion thereof can be located on the server 140. Additionally, the game engine can be located on the client computing device 130 instead of the server 140. Regardless the distribution, game input 135 receives the motion data, which can be modified, and provides the motion data to the game state update 136. The motion data, and additional game state information, is provided to the game engine 142 via the game state update 136. The game engine 142 executes the video game using the motion data and the other game state information and sends updated game state information to the game software 134 on the client computing device 130 for generating scenes and displaying on the screen. In some examples, the games engine 142 can execute the video game based on the motion data and generate a video stream that is sent to the client computing device 130 to display. The different types of gaming systems and distribution of functionalities between local and cloud computing devices can vary with the disclosed cheating detection strategy.

In addition to the game engine 142, the modified motion data is also provided to the cheating alert system 137. The cheating alert system 137 includes a submovement analyzer 138 and a cheat detector 139. The submovement analyzer 138 segments data submovements from the modified motion data and determines data submovement attributes from the detected data submovements. The data submovement attributes are provided to the cheat detector 220.

The cheat detector 220 determines the data submovements that are a deviation of human submovements. The cheat detector 220 can determine the deviations using the data submovement attributes. The submovement analyzer 138 and the cheat detector 220 can function as discussed below with respect to submovement analyzer 210 and cheat detector 220 of FIG. 2.

FIG. 2 illustrates a block diagram of an example of a cheating alert system 200 constructed according to the principles of the disclosure. The cheating alert system 200 receives motion data and generates an alert when determining possible non-human motion from the motion data. The cheating alert system 200 can be implemented as part of video game software, such as the game software 134 of FIG. 1. The cheating alert system 200 can be a series of operating instructions that correspond to one or more algorithms that provide a cheat alert system as disclosed herein. For example, the operating instructions can be directed to segment data submovements from motion data and determine data submovements that are a deviation of human submovements. The operating instructions can be stored on a nontransitory memory or memories and can direct the operation of one or more processors when executed thereon. The cheating alert system 200 includes a submovement analyzer 210 and a cheating detector 220. The submovement analyzer 210 and the cheating detector 220 can be implemented on a single computing device, such as client computing device 130 of FIG. 1, or distributed over multiple computing devices, such as the client computing device 130 and the server 140 of FIG. 1.

The submovement analyzer 210 receives motion data, such as from a user input device. The motion data may have been altered by a cheating tool. The submovement analyzer 210 segments the motion data into data submovements for further analysis. The submovement analyzer 210 can use start and end thresholds to segment the data submovements in the motion data.

Figure 3:
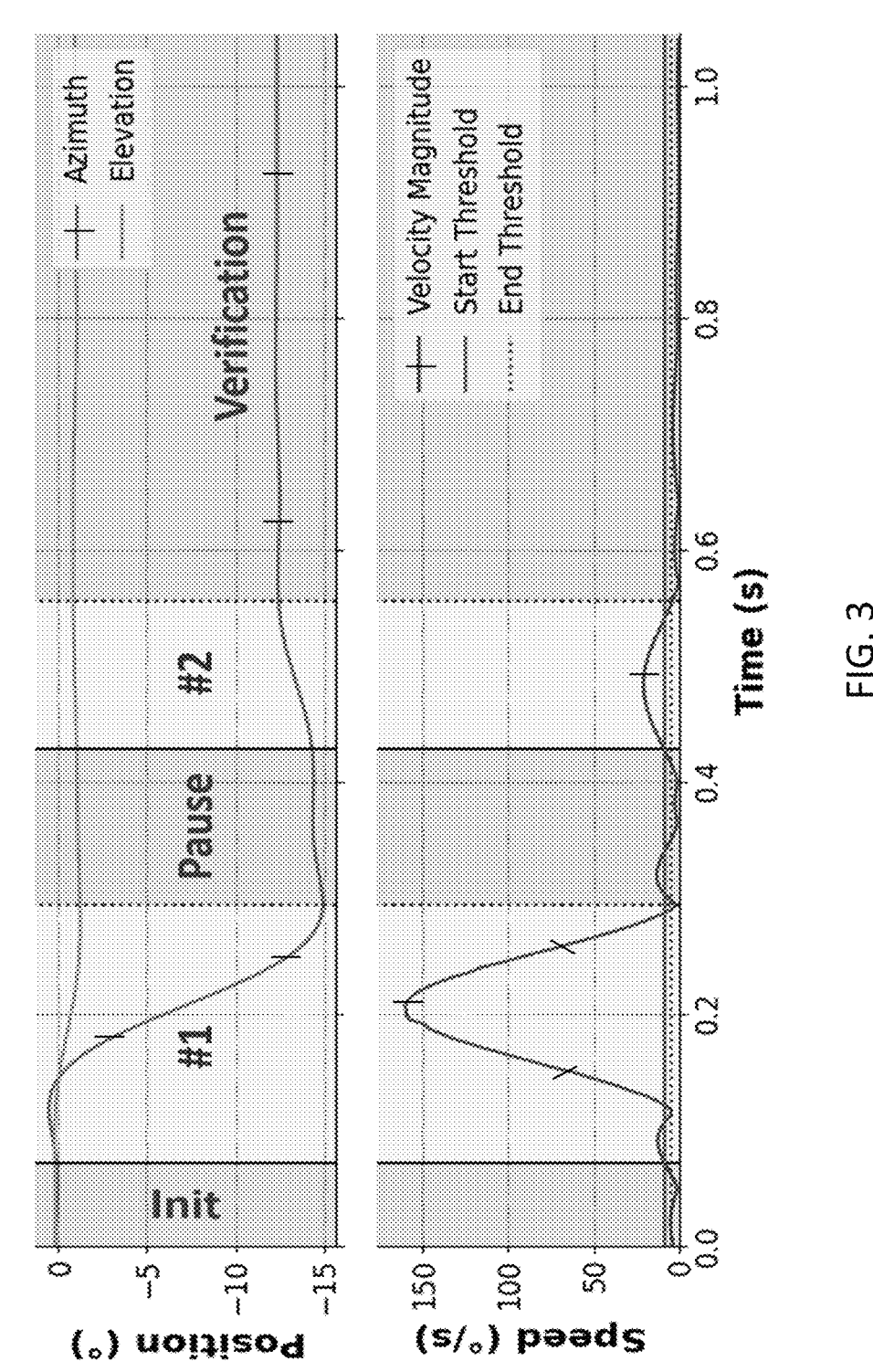
FIG. 3 illustrates an example of two submovements, #1 and #2, from mouse motion data using a simple speed-based 2-threshold (start/stop) detector.

Submovements are atomic, pseudo-ballistic motions that can be used to decompose larger human motion patterns into individual perception-action cycles. Submovements are typically segmented from periods of low-to-no motion and occur at separations guaranteed by the limits of the perception-action cycle of a human. FIG. 3 illustrates an example of two submovements, #1 and #2, from mouse motion data using nothing other than a simple speed-based 2-threshold (start/stop) detector. The two submovements are illustrated as position versus time and speed versus time. An initialization stage is first shown followed by movement #1, a pause, movement #2, and a verification stage. The initialization stage corresponds to something being presented for the first time in a scene and represents a user initializing on a task. Movement #1 corresponds to a user rotating their mouse fifteen degrees. The pause corresponds to the user beginning to slightly rotate back and movement #2 corresponds to the mouse being rotated back two to three degrees, such as to align with a target. The verification corresponds to the reticle displayed on the scene, which is being controlled by the mouse, being over the target and the user is ready to click the mouse to shoot the target.

The submovement analyzer 210 can use two different thresholds for detecting start of a submovement and detecting the end of a submovement; a starting point and a finishing point. A simple type of hysteresis detector can be used for detecting the submovements using the thresholds. Typically the end threshold is lower than the start threshold. As such, bouncing can be reduced or prevented. The thresholds can be tuned on a per task basis based on, for example, an expected action of the user.

Figure 4:
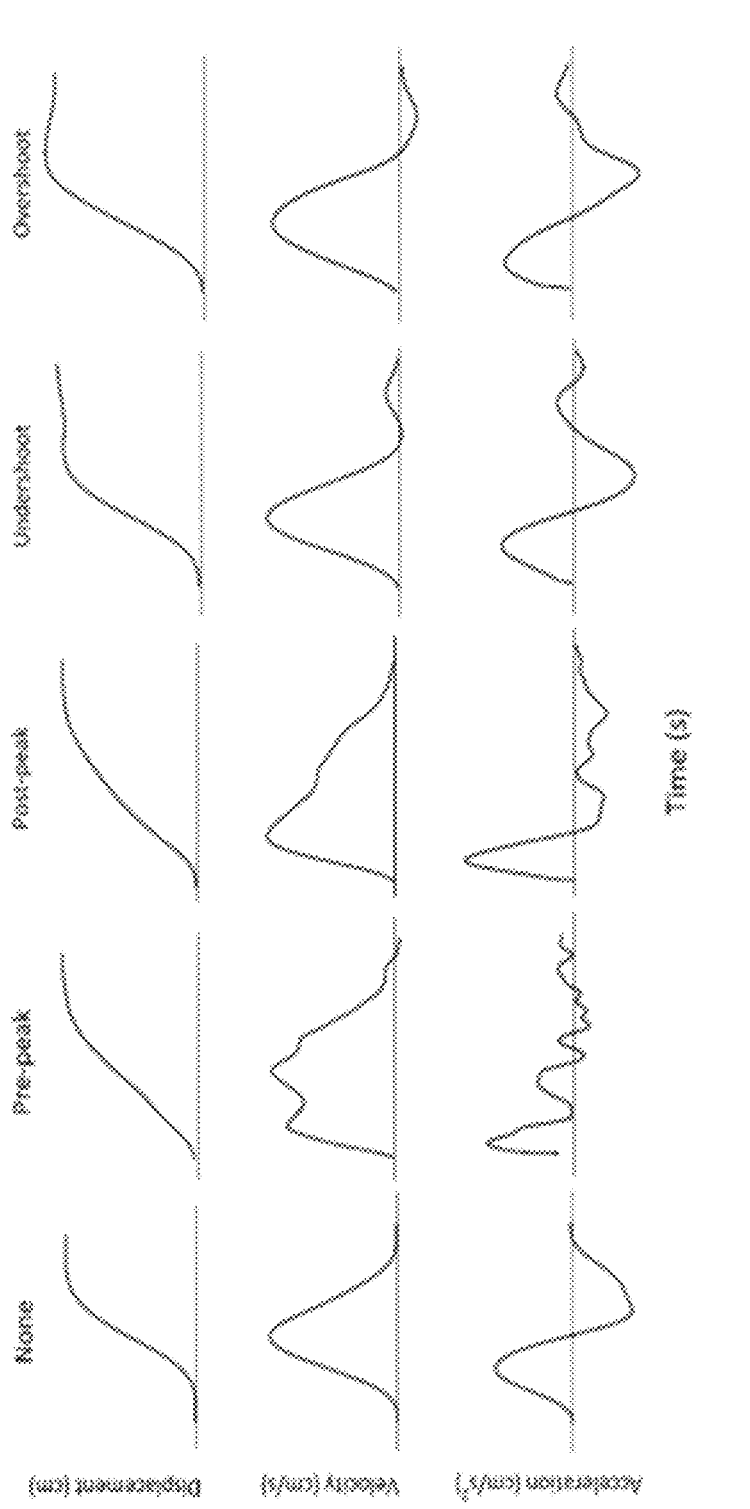
FIG. 4 illustrates an example of four types of submovements as defined by a known algorithm.

Not every submovement need be purely ballistic, but generally speaking submovements fall into a set of classes defined by the constraints of the human motor system. Prior art further divides submovements into such classes which may or may not include online corrections that deviate them from being "purely" ballistic in nature. FIG. 4 illustrates an example of four types of submovements that include ballistic shapes. Decomposing of the motion data can be used to detect the submovements. For example, motion data can be a complicated wave that is a sum of multiple waves of a single shape or form and decomposing of the complicated wave into wavelets, such as of a single shape, can be used to detect data submovements from the motion data. The disclosure recognizes that while theoretically optimal motor strategies for targeting dictate moving at "maximum" velocities for minimum amounts of time (implying infinite accelerations), practical considerations limit this optimal view. Furthermore the human visual and motor systems apply further limits to what can be achieved in actuation using an input device, such as a mouse.

Once the data submovements are segmented, attributes of the submovements are obtained and sent to the cheating detector 220, which determines if the motion data includes data submovements that are a deviation of human submovements. The cheating detector 220 can use various ones of the different attributes or combinations thereof for determining deviations.

The cheating detector 220 can use submovement and/or pause count to validate significant differences in player performance, but it is worth noting that these metrics are far less granular than something like peak/average velocity/ acceleration and may make it more difficult to evaluate whether an action was made by a cheating tool or a real user. One or more of the submovement attributes noted above can be modelled and used for comparison to detect data submovements that are not human.

To provide additional specificity for detection, distributions may be conditioned on one or more game-state variables, such as the player's character/role, weapon/task, position, as well as temporal information such as time since/until the last/next shot. One or more of the submovement conditions noted above can be modelled and used for comparison to detect data submovements that are not human. While collecting data to initialize deeply conditioned distributions will take more time, the collected data provides the additional benefit of narrower distributions and more distinct distributional features that can be used to identify cheating.

It may also be possible to use these statistical characterization approaches to delineate the aim movement of one player from another, preventing against "cheats" wherein a (presumably more skilled) player plays on another player's account in order to improve their rank/stats.

Some aim assist cheating tools inject a large motion, just before click to align the user's view with a target. This case is similar to the immediate delta or bounded velocity detection approach described above and the cheating detector 220 can detect as a "last minute correction". For example, the cheating detector 220 can detect the "correction" a number of ways, including its duration, acceleration, and temporal proximity to the original human motion.

The cheating detector 220 can detect subhuman submovements by comparing the data submovement attributes to attributes of general human submovements. These attributes of general human submovements can be stored in data storage or memory represented by human submovement data storage 224. In addition to attributes and data associated with human submovements in general, the human submovement data storage 224 can also include the submovements of one or more particular individuals. The particular submovement attributes associated with different individuals can be used to for modelling an individual's submovement count, time, velocity, and error distributions potentially conditioned on spatial task difficulty (target size/distance) and/or game conditions (character/weapon/game type). This type of cheating detection is interesting as it not only flags superhuman interactions, but also flags dramatic changes within an individual's performance that cannot be easily explained (i.e., a more skilled friend playing on their account). The downside of this modelling approach is false detection of legitimate improvements in play (especially after long breaks) as cheating.

With this approach, the cheating detector 220 would flag gameplay as potential cheating whenever submovement distributions shift positively in a dramatic way (at a rate faster than some predefined threshold). As an example, if a user typically has an 80% chance of making a 2nd submovement for a task with high spatial difficulty (small and distant target), which suddenly drops to just 30% this gameplay might be flagged as cheating. In a more nuanced case, a user who typically "tracks" targets would tend to have a submovement speed distribution biased towards lower speed and higher accuracy. If suddenly this distribution shifts towards high speed, and lower accuracy (traditional "flicking" behavior) cheating may be flagged.

Detection based on individualized submovement distributions requires a valid, recent profiling period during which representative user gameplay can be modeled with statistical significance. Additionally it assumes that large/rapid distributional shifts are a result of cheating, and not rapid improvement in player performance. For these reasons, the cheating detector 220 can avoid flagging based on submovement distributions in several common cases for competitive users, wherein:

1. A user is still familiarizing themselves with the game and is therefore rapidly improving.
2. A user makes a meta-level strategy change that dramatically alters their submovement distributions.
3. A user uses cheats consistently from their very first time playing a game, providing no data to delineate as anomalous cheating.

Figure 5:
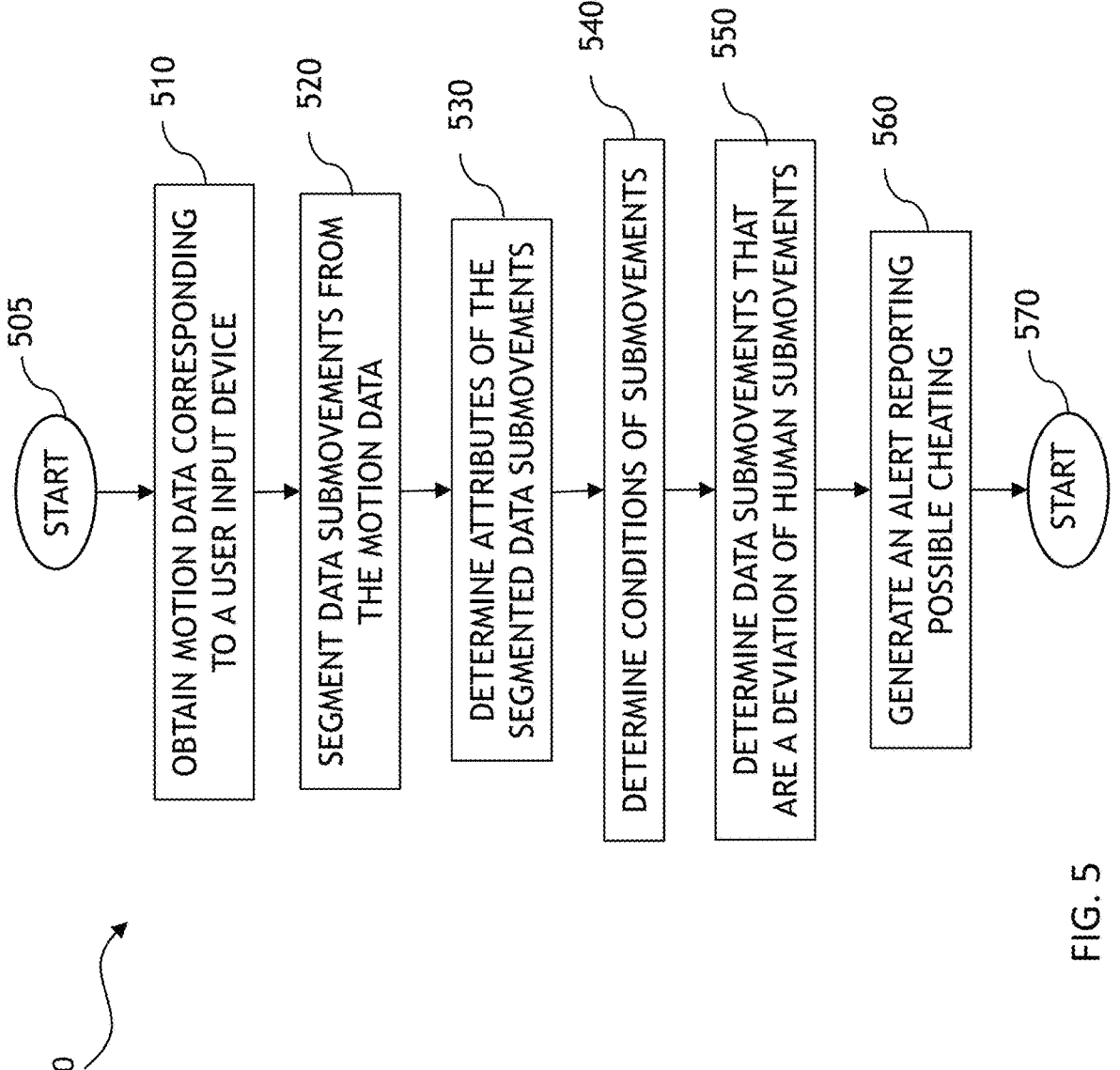
FIG. 5 illustrates a flow diagram of an example of a method of monitoring cheating in video games carried out according to the principles of the disclosure.

FIG. 5 illustrates a flow diagram of an example of a method 500 of monitoring cheating in video games carried out according to the principles of the disclosure. One or more of the steps of method 500 can be carried out by a series of operating instructions, which causes at least one processor to implement one or more of the steps of method 500. The series of operating instructions correspond to an algorithm or algorithms that are, for example, detecting possible cheating by determining data submovements that are a deviation of human submovements. The series of operating instructions can be stored on a non-transitory computer-readable medium of a computer program product. The non-transitory computer-readable medium could be any type of non-transitory computer-readable medium, e.g., a solid-state memory, a fixed optical disk, etc. The at least one processor can be one of the processors of client computing device 510. At least a portion of the method 500 can be performed by a cheating alert system, such as cheating alert system 200 of FIG. 2. The method 500 begins in step 505.

In step 510, motion data corresponding to a user input device is obtained. The motion data can be received from an input port of a client computing device. The motion data may be actual motion data from the user input device or can be modified motion data that has been altered by one or more cheating tools.

In step 520, data submovements are segmented from the received motion data. The data submovements can be segmented by using a starting and a stopping threshold to delineate submovements from the motion data.

Attributes of the segmented data submovements can be determined in step 530. The attributes can be, for example, submovement count, submovement duration, initialization, pause, and verification durations, submovement velocity, submovement error, and submovement shape.

Submovement conditions are also determined in step 540. The submovement conditions can be, for example, game specifics, task type, task difficulty, etc. The conditions associated with the submovements can be determined from game state information. A cheating detector, such as cheating detector 220, can obtain the submovement conditions from a game state update.

In step 550, data submovements that deviate from human submovements are determined. The data submovement attributes and/or submovement conditions can be used for determining deviations. For example, the data submovement attributes can be compared to human attributes to detect submovements that are not human submovements. A duration of a data submovement that is less than normal human interaction can indicate that the data submovement is a deviation. Distribution modelling can also be used for determining deviations.

An alert reporting possible cheating is generated in step 560 based on the outcome of step 550. The alert can be sent to a server operating the game engine for further analysis. The server can include a cheating analysis system that receives possible cheating notifications and alerts from other cheating detection methodologies than described herein. The cheating analysis system can review the cheating information for determining cheaters. Human review may then be used to make a determination and take action. The method 500 continues to step 570 and ends.

FIG. 6 illustrates a block diagram of an example of a computing system 600 in which at least a portion of the methods, systems, or computer program products disclosed herein for monitoring cheating in video games can be implemented. The computing system 600 can be used for interactive programs. The gaming system 100 can be, for example, implemented on the computing system 600. Computing system 600 includes client computing device 610, a screen or display 620, input device 630, and a server 640.

Client computing device 610 includes central processing unit (CPU) 611, memory 612, graphics processing unit (GPU) 613, user interface 614, storage 615, network interface 616, and communications bus 617. While FIG. 6 depicts display 620 connected directly to GPU 613, display 620 could be connected to client computing device 610 in other conventional manners and can be integrated with the client computing device 610. Client computing device 610 could be a gaming console, a standalone personal computer (PC), a smartphone, a computing pad or tablet, or other like hardware device. Instructions stored in memory 612 (or storage 615) could cause either CPU 611 or GPU 613 to provide cheat detection and alerting as discussed above with respect to FIGS. 1 to 5. Other instructions stored on memory 612 (or storage 615) cause CPU 611 and/or GPU 613 to execute gaming software to enable users to play games. A portion of the gaming software can be executed on the server 640.

Users provide motion data via input device 630 that is received by user interface 614 and communicated via communications bus 617 to CPU 611/GPU 613. Input device 630 can be a mouse or another type of device, e.g., trackpad, game controller, etc. could be used by the user to provide inputs to the client computing device 610 for game play as well.

The disclosed cheat detection methodology relates to identifying cheaters making super-human movements in interactive programs. For example, users trying to outcompete their opponents by using large aim assists and aim bots that perform actions that are not feasibly human. While the disclosed methodology does not necessarily eliminate the possibility of cheating, the benefit that various cheating solutions offer to the cheater can be substantially reduced.

The cheat detection methodology may not completely remove the ability of cheaters to modify the motion of an input device in the favor of improving their aim in order to avoid detecting valid motion as cheating, and as such may not be able to delineate the best human player from a cheat bot emulating that player.

Portions of disclosed embodiments may relate to computer storage products with a non-transitory computer-readable medium that have program code thereon for performing various computer-implemented operations that embody a part of an apparatus, device or carry out the steps of a method set forth herein. Non-transitory used herein refers to all computer-readable media except for transitory, propagating signals. Examples of non-transitory computer-readable media include, but are not limited to: magnetic media such as hard disks, floppy disks, and magnetic tape; optical media such as CD-ROM disks; magneto-optical media such as floptical disks; and hardware devices that are specially configured to store and execute program code, such as ROM and RAM devices. Examples of program code include both machine code, such as produced by a compiler, and files containing higher level code that may be executed by the computer using an interpreter.

A portion of the above-described apparatus, systems or methods may be embodied in or performed by various digital data processors or computers, wherein the computers are programmed or store executable programs of sequences of software instructions to perform one or more of the steps of the methods. The software instructions of such programs may represent algorithms and be encoded in machine-executable form on non-transitory digital data storage media, e.g., magnetic or optical disks, random-access memory (RAM), magnetic hard disks, flash memories, and/or read-only memory (ROM), to enable various types of digital data processors or computers to perform one, multiple or all of the steps of one or more of the above-described methods, or functions, systems or apparatuses described herein. The data storage media can be part of or associated with the digital data processors or computers.

The digital data processors or computers can be comprised of one or more GPUs, one or more CPUs, one or more of other processor types, or a combination thereof. The digital data processors and computers can be located proximate each other, proximate a user, in a cloud environment, a data center, or located in a combination thereof. For example, some components can be located proximate the user and some components can be located in a cloud environment or data center.

The GPUs can be embodied on a single semiconductor substrate, included in a system with one or more other devices such as additional GPUs, a memory, and a CPU. The GPUs may be included on a graphics card that includes one or more memory devices and is configured to interface with a motherboard of a computer. The GPUs may be integrated GPUs (iGPUs) that are co-located with a CPU on a single chip. Configured means, for example, designed, constructed, or programmed, with the necessary logic and/or features for performing a task or tasks.

Network environments suitable for use in implementing embodiments of the disclosure may include one or more client devices, servers, network attached storage (NAS), other backend devices, and/or other device types. The client devices, servers, and/or other device types (e.g., each device) may be implemented on one or more instances of the computing device(s) disclosed herein e.g., each device may include similar components, features, and/or functionality of the computing device(s) disclosed herein.

Components of a network environment may communicate with each other via a network(s), which may be wired, wireless, or both. The network may include multiple networks, or a network of networks. By way of example, the network may include one or more Wide Area Networks (WANs), one or more Local Area Networks (LANs), one or more public networks such as the Internet and/or a public switched telephone network (PSTN), and/or one or more private networks. Where the network includes a wireless telecommunications network, components such as a base station, a communications tower, or even access points (as well as other components) may provide wireless connectivity.

Compatible network environments may include one or more peer-to-peer network environments—in which case a server may not be included in a network environment—and one or more client-server network environments—in which case one or more servers may be included in a network environment. In peer-to-peer network environments, functionality described herein with respect to a server(s) may be implemented on any number of client devices.

A network environment may include one or more cloud-based network environments, a distributed computing environment, a combination thereof, etc. A cloud-based network environment may include a framework layer, a job scheduler, a resource manager, and a distributed file system implemented on one or more of servers, which may include one or more core network servers and/or edge servers. A framework layer may include a framework to support software of a software layer and/or one or more application(s) of an application layer. The software or application(s) may respectively include web-based service software or applications. In embodiments, one or more of the client devices may use the web-based service software or applications (e.g., by accessing the service software and/or applications via one or more application programming interfaces (APIs)). The framework layer may be, but is not limited to, a type of free and open-source software web application framework such as that may use a distributed file system for large-scale data processing (e.g., "big data").

A cloud-based network environment may provide cloud computing and/or cloud storage that carries out any combination of computing and/or data storage functions described herein (or one or more portions thereof). Any of these various functions may be distributed over multiple locations from central or core servers (e.g., of one or more data centers that may be distributed across a state, a region, a country, the globe, etc.). If a connection to a user (e.g., a client device) is relatively close to an edge server(s), a core server(s) may designate at least a portion of the functionality to the edge server(s). A cloud-based network environment may be private (e.g., limited to a single organization), may be public (e.g., available to many organizations), and/or a combination thereof (e.g., a hybrid cloud environment).

The client device(s) may include at least some of the components, features, and functionality of the example computing device(s) described herein with respect to FIG. 1. In addition to previous examples not as a limitation, a client device may be embodied as a Personal Computer (PC), a laptop computer, a mobile device, a smartphone, a tablet computer, a smart watch, a wearable computer, a Personal Digital Assistant (PDA), an MP3 player, a virtual reality headset, a Global Positioning System (GPS) or device, a video player, a video camera, a surveillance device or system, a vehicle, a boat, a flying vessel, a virtual machine, a drone, a robot, a handheld communications device, a hospital device, a gaming device or system, an entertainment system, a vehicle computer system, an embedded system controller, a remote control, an appliance, a consumer electronic device, a workstation, an edge device, any combination of these delineated devices, or any other suitable device.

Various aspects of the disclosure can be claimed including the systems and methods. Each of the independent claims provided below may have one or more of the elements of the dependent claims presented below in combination.

Those skilled in the art to which this application relates will appreciate that other and further additions, deletions, substitutions and modifications may be made to the described embodiments.

What is claimed is:

1. A method of monitoring cheating in interactive programs using one or more processors, comprising:
    obtaining motion data corresponding to a user input device interacting with an interactive program;
    segmenting data submovements from the motion data, wherein the data submovements are decompositions of the motion data; and
    determining data submovements that deviate from human submovements based on a derivative of a velocity of the data submovements, wherein the derivative of the velocity includes acceleration of the data submovements and the deviation is determined when the acceleration is constant.

2. The method as recited in claim 1, wherein the input device is a mouse.

3. The method as recited in claim 1, wherein the input device is a spatially tracked controller.

4. The method as recited in claim 1, wherein the motion data is positional information over time.

5. The method as recited in claim 1, wherein the segmenting uses start and stop thresholds to detect the data submovements from the motion data.

6. The method as recited in claim 5, wherein the start and stop thresholds are based on the interactive program.

7. The method as recited in claim 1, wherein the segmenting uses wavelet decomposition to detect the data submovements from the motion data.

8. The method as recited in claim 1, wherein the deviation is further based on a duration of one or more of the data submovements.

9. The method as recited in claim 1, wherein the deviation is further based on a number of data submovements for an action.

10. The method as recited in claim 9, wherein an action is a response to detection of a target.

11. The method as recited in claim 9, wherein the deviation is determined when the number of data submovements is one.

12. The method as recited in claim 1, wherein the deviation is further determined when a shape of the data submovements is not a ballistic shape.

13. The method as recited in claim 1, wherein the deviation is further based on a distribution of the data submovements compared to a general statistical model.

14. The method as recited in claim 1, wherein the deviation is further based on a distribution of the data submovements compared to a user specific statistical model.

15. The method as recited in claim 1, wherein the human submovements are for a particular user.

16. The method as recited in claim 1, wherein the interactive program is a video game.

17. The method as recited in claim 1, further comprising generating an alert of possible cheating when determining the deviation.

18. A cheat alert system for one or more interactive programs, comprising:
    one or more processors to perform operations at least including:
        segmenting data submovements corresponding to an input device, wherein the data submovements are decompositions of the motion data from the input device; and
        detecting data submovements that deviate from human submovements based on a derivative of a velocity of the data submovements, wherein the derivative of the velocity is jerk present in maximum rate acceleration or deceleration curves of the data submovements.

19. The cheat alert system as recited in claim 18, wherein the operations further include reporting potential cheating based on the detecting.

20. The cheat alert system as recited in claim 18, wherein the detecting is further based on a duration of one or more of the data submovements or a number of submovements for an action.

21. The cheat alert system as recited in claim 18, wherein the detecting is further based on a distribution of the data submovements compared to a user specific statistical model or a general statistical model.

22. The cheat alert system as recited in claim 18, wherein the detecting is further based on a combination of attributes of the data submovements.

23. A gaming system, comprising:

one or more processors that perform operations at least including:

receiving motion data from an input device;

segmenting data submovements from the motion data, wherein the data submovements are decompositions of the motion data; and detecting data submovements that deviate from human submovements based on a derivative of a velocity of the data submovements, wherein the derivative of the velocity is jerk present in maximum rate acceleration or deceleration curves of the data submovements.

24. The gaming system as recited in claim 23, wherein the operations further include generating an alert of possible cheating when determining the deviation.

25. The gaming system as recited in claim 23, wherein the derivative of the velocity is acceleration of the data submovements.

* * * * *